United States Patent [19]

Melocik et al.

[11] Patent Number: 4,471,273
[45] Date of Patent: Sep. 11, 1984

[54] DUAL-MOTOR CONTROL APPARATUS

[75] Inventors: Grant C. Melocik, Chardon; William Pickering, University Heights, both of Ohio

[73] Assignee: Towmotor Corporation, Mentor, Ohio

[21] Appl. No.: 455,777

[22] Filed: Jan. 5, 1983

[51] Int. Cl.³ .................... H02P 5/46; H02P 7/68
[52] U.S. Cl. ........................ 318/55; 318/67; 318/80; 318/139; 180/6.5; 364/424
[58] Field of Search ............ 318/587, 139, 65, 54, 318/55, 58, 80, 82, 67; 364/424; 180/6.28, 6.48, 6.5

[56] References Cited

U.S. PATENT DOCUMENTS

| | | | |
|---|---|---|---|
| 3,289,062 | 11/1966 | Dannettell | 318/139 |
| 3,297,926 | 1/1967 | Campbell et al. | 318/138 |
| 3,349,309 | 10/1967 | Dannettell | 318/139 |
| 3,551,773 | 12/1970 | Dannettell | 318/341 |
| 3,596,154 | 7/1971 | Gurwicz | 318/52 |
| 3,646,414 | 2/1972 | Gurwicz | 318/67 |
| 3,720,863 | 3/1973 | Ringland et al. | 318/67 X |
| 4,109,186 | 8/1978 | Farque | 180/6.5 X |
| 4,168,468 | 9/1979 | Mabuchi et al. | 180/6.5 X |
| 4,196,785 | 4/1980 | Downing, Jr. | 180/6.28 |
| 4,363,999 | 12/1982 | Preikschat | 318/139 |

FOREIGN PATENT DOCUMENTS

| | | | |
|---|---|---|---|
| 44773 | 1/1982 | European Pat. Off. | 318/139 |
| 1551782 | 8/1979 | United Kingdom | |

*Primary Examiner*—J. V. Truhe
*Assistant Examiner*—Bentsu Ro
*Attorney, Agent, or Firm*—Stephen L. Noe

[57] ABSTRACT

The invention pertains to a control circuit (10) for controlling the speed of a pair of motors (12,14), including a pair of switching elements (68,74) coupling power to the motors (12,14), a pair of controllable circuits (64,74) for driving the switching elements (68, 74), a circuit (36) for generating digital numbers representing the same command speed for each of the motors (12,14), a circuit (38) for generating digital numbers representing differential command speeds for the motors (12,14), and a data processor (56) for controlling the pair of controllable circuits (64,74) in response to the digital numbers. By utilizing digital and integrated circuit technology, prior, essentially linear, control apparatus, which are relatively unreliable, expensive and slow, need not be used.

12 Claims, 7 Drawing Figures

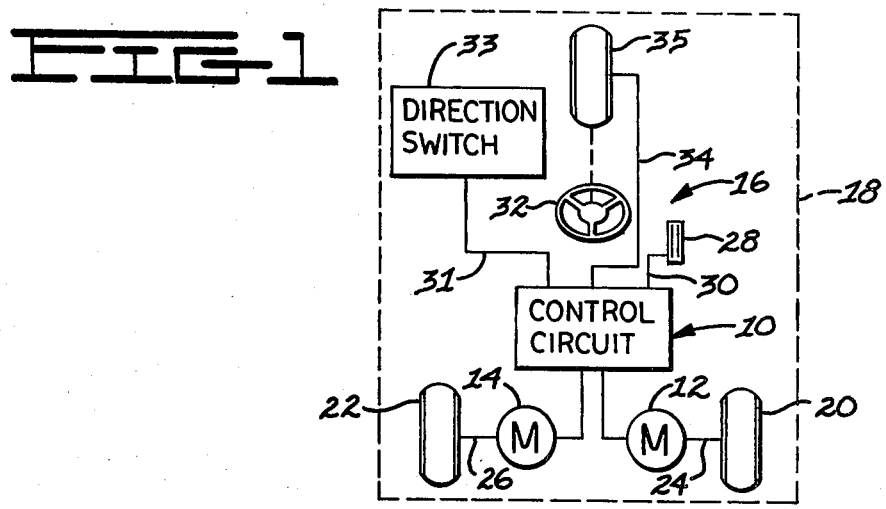
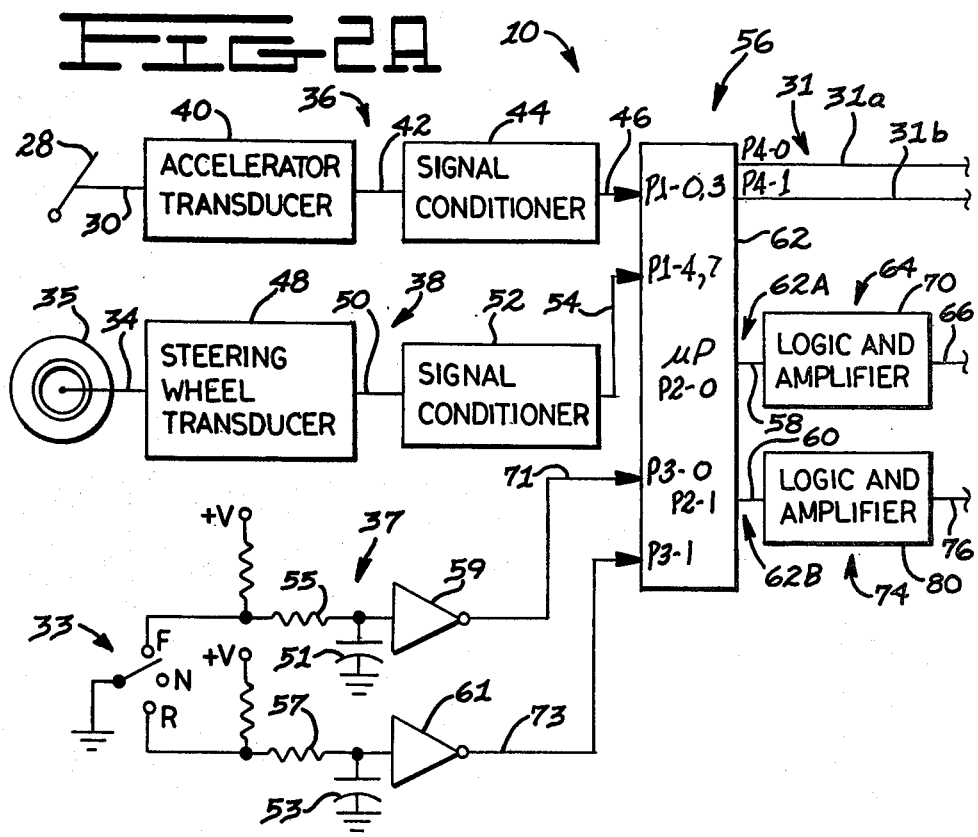

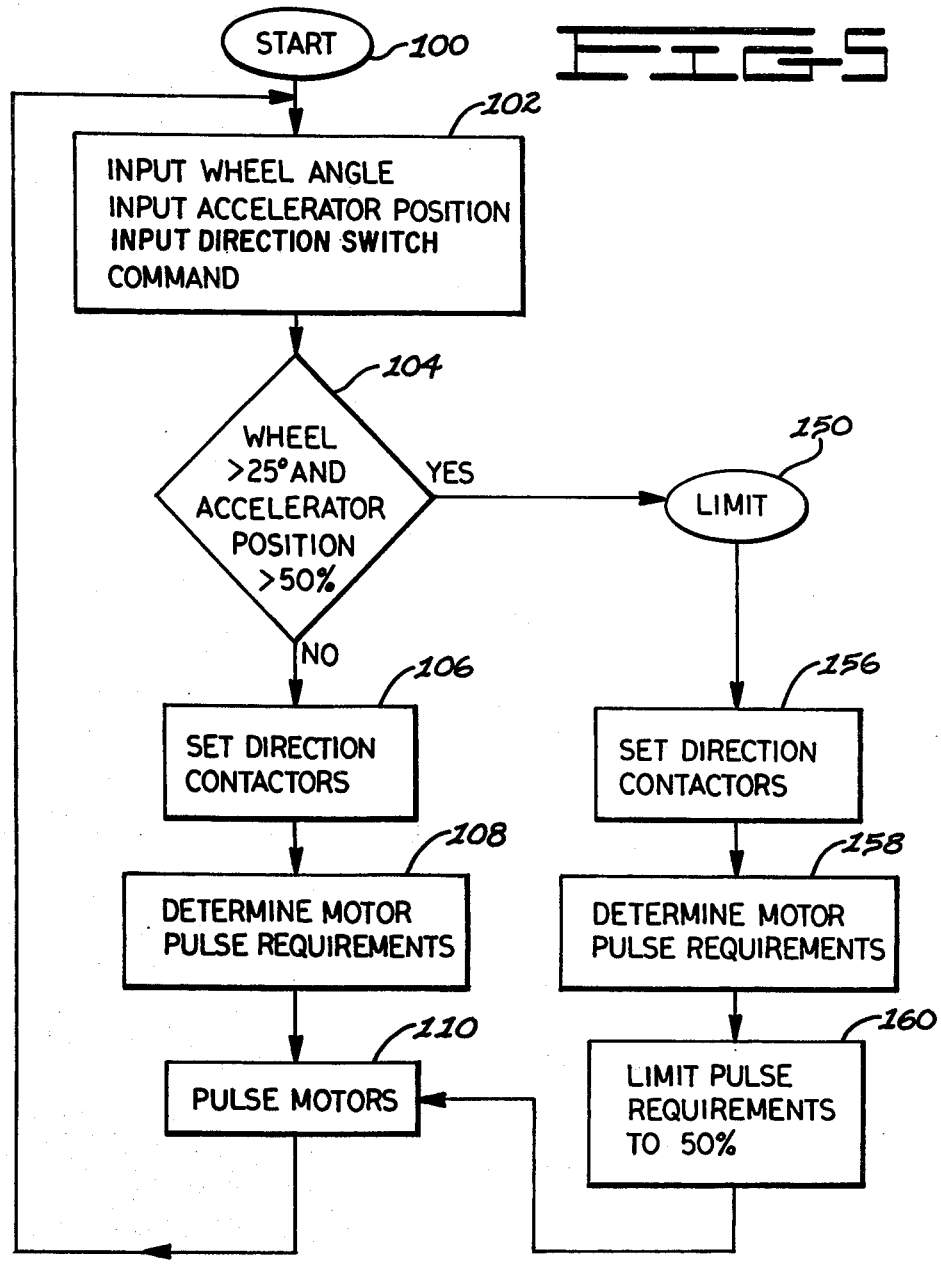

DUAL-MOTOR CONTROL APPARATUS

DESCRIPTION

1. Technical Field

This invention relates generally to motor control apparatus and, more particularly, to apparatus for regulating the supply of power to a pair of independently controlled vehicle drive motors.

2. Background Art

Several classes of powered vehicles incorporate a plurality of independently controllable drive motors. For example, many types of electric vehicles include two drive wheels, each of the drive wheels being driven independently by an associated motor. A control circuit is employed to regulate the supply of electrical power to the motors and, thus, the speed of the driven wheels.

To drive the vehicle in a straight path, the same power is supplied to each of the drive motors under control of the control circuit. These motors thus operate at the same speed to drive the respective wheels at the same speed. When the vehicle is traversing a curved path, the inner wheel must rotate slower than the outer wheel. Therefore, the control circuit controls the supply of power to the drive motors and makes the speed of the motor driving the inner wheel slower than the speed of the motor driving the outer wheel. As the radius of the curved path is made progressively smaller the speed differential between the inner and outer wheels becomes progressively greater, culminating in the extreme case in which the inner and outer wheels are counter rotating.

Existing control circuits have been developed to control the supply of power to dual motors. A disadvantage common to these control circuits is that they are based upon out-dated, linear or analog design concepts. Moreover, existing multiple motor controls typically include dedicated logic circuitry. Consequently, the motor speed control functions cannot be easily varied or tailored to, for example, supply appropriate power to different rated motors for different sized vehicles.

The present invention is directed to overcoming one or more of the problems as set forth above.

DISCLOSURE OF THE INVENTION

In one aspect of the present invention, a vehicle control system for controlling first and second power switching means for coupling power to first and second respective drive motors includes first and second controllable means for controllably operating the first and second power switching means and first and second transducer means for generating first and second command motor speed signals. The improvement comprises first means for generating first digital numbers in response to the first command motor speed signals, second means for generating second digital numbers in response to the second command motor speed signals, and means for generating first and second pulse trains in response to the respective first and second digital numbers and for delivering the pulse trains to the first and second controllable means.

Prior control circuits do not offer the advantages of the present vehicle control system and are implemented essentially as linear or analog circuits which inherently are not as reliable, cost-effective, fast and space-saving as are digital and integrated circuits. The control apparatus of the present invention is designed and implemented using digital and integrated circuit technology and is advantageously software programmable.

BRIEF DESCRIPTION OF THE DRAWINGS

For a better understanding of the present dual motor control apparatus, reference may be made to the accompanying drawings in which:

FIG. 1 is a schematized top view of a vehicle incorporating the present invention;

FIGS. 2A and 2B are block diagrams of one embodiment of the present dual motor control apparatus;

BEST MODE FOR CARRYING OUT THE INVENTION

Figure 2B:
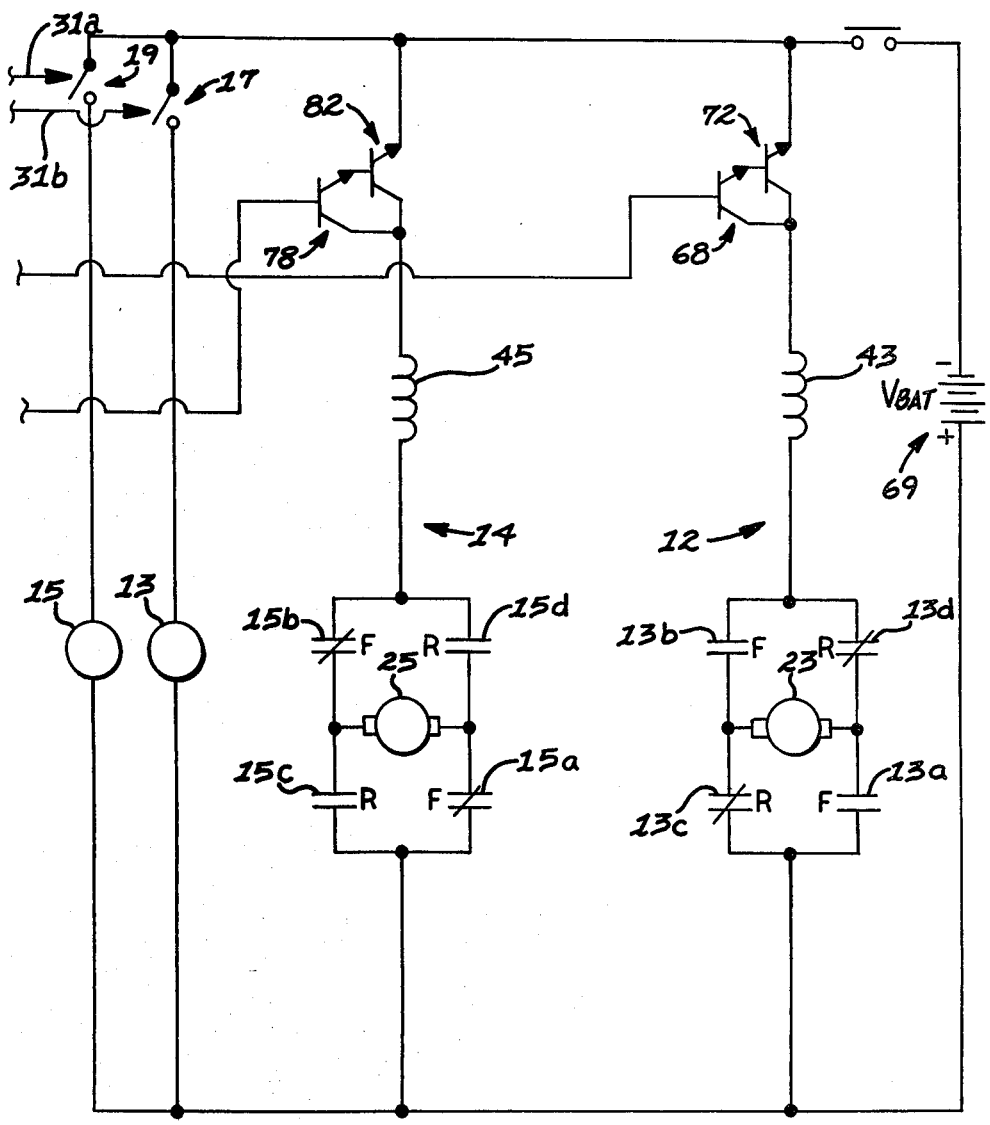

FIG. 1 shows a vehicle control system 16 having a control circuit 10 for independently controlling the supply of electrical power to first and second electric drive motors 12,14. As one example, the vehicle control system 16 controls an electric vehicle 18 having a first drive wheel 20 and a second drive wheel 22. The first motor 12 rotates the first drive wheel 20 through a first shaft 24 and the second motor 14 rotates the second drive wheel 22 through a second shaft 26.

The vehicle control system 16 includes a direction switch 33 having forward, reverse, and neutral switch command positions. The control circuit 10 receives command direction input signals in response to any one position of the direction switch via an associated line 31.

The vehicle control system 16 also includes an accelerator pedal 28 that can be positioned at any one of a plurality of positions, each representing a desired or command motor speed. The control circuit 10 receives command speed input signals in response to any one position of the accelerator pedal 28 via an associated line 30. The vehicle control system 16 also includes a steerable wheel 35 associated with a steering wheel 32. The steerable wheel 35 rotates through a plurality of angular positions in response to rotation of the steering wheel 32 to steer the vehicle 18 along a straight or curved path. Signals corresponding to any one of the rotational or angular positions of the steerable wheel 35 are delivered to the control circuit 10 via an associated line 34.

In response to the vehicle 18 being driven along a straight path, the first drive motor 12 and the second drive motor 14 are supplied with equivalent mean power and driven at the same speed to rotate the wheels 20,22 at the same speeds. Conversely, in response to the vehicle 18 being driven along a curved path, differential mean power is supplied to the first drive motor 12 and the second drive motor 14 to rotate the inner one of the first and second wheels 20,22 slower than the outer one of the first and second wheels 20,22; inner and outer in this case referring to the relative position of the wheels 20,22 with respect to the center of the radius of the arc described by the curved path, the inner one of the wheels 20,22 being nearer the center than the outer one of the wheels 20,22.

FIG. 2 further illustrates the apparatus or control circuit 10 for controlling the supply of electrical power to the first drive motor 12 and the second drive motor 14 in response to the positions of the direction switch 33, the accelerator pedal 28 and the steerable wheel 35. The control circuit 10 includes a first means 36 for producing first digital numbers in response to the first command motor speed signals for the first and second drive motors 12,14, respectively, and a second means 38 for producing second digital numbers in response to second command motor speed signals for the first and second drive motors 12,14. The first means 36 includes a first transducer means 40 for receiving accelerator position information on an associated line 30 and generating, for example, 4-bit digital signals or numbers in response to the received information that are delivered over a first set of lines 42. A signal conditioning circuit 44 conditions the numbers being received on the first set of lines 42 and delivers these numbers on a second set of lines 46. Thus, the digital numbers on the second set of lines 46 can range from 0000, in response to a zero speed command when the accelerator pedal 28 is not depressed, to 1111 in response to a maximum speed command when the accelerator pedal 28 is fully depressed. The progression from 0000 to 1111 may be linear or non-linear as desired. A non-linear progression provides increased resolution in the low speed range for increased operator convenience and control. The range of digital numbers from 0000 to 1111 in the binary coded decimal format is used only for convenient illustration, and can, of course, be other suitably coded binary representations having a number of bits consistent with the desired precision, for example, a gray code.

The second means 38 includes a second transducer means 48 for receiving steerable wheel angular position information on an associated line 34 and producing, for example, 4-bit digital signals or numbers in response to the received information that are delivered over a third set of lines 50. A signal conditioning circuit 52 conditions the numbers being received on the third set of lines 50 and delivers these numbers on a fourth set of lines 54. Thus, the digital numbers on the fourth set of lines 54 can range from 0000, representing a first maximum angular position of the steerable wheel 35 in a first direction to 1111 representing a second maximum angular position of the steerable wheel 35 in a second direction. The digital numbers between 0000 and 1111 naturally represent respective steerable wheel angular positions between the two maximum positions and is advantageously arranged to provide a non-linear representation of the steerable wheel angular position. Such non-linear representation results in greater resolution of the steerable wheel angular position in the regions adjacent the two maximum positions of the steerable wheel 35 and decreased resolution in the region adjacent the 0° position of the steerable wheel 35. Such non-linear representation results in increased controllability of the controlled wheels 20,22 when the vehicle 18 is negotiating a corner, as is discussed below. Like the accelerator pedal 28 positions discussed above, the range of digital numbers from 0000 to 1111 can be any suitably coded binary representation.

A data processor means 56 generates pulse trains on respective first and second lines 58,60 in response to the respective digital numbers received on the second and fourth lines 46,54. The data processor means 56 includes, for example, a microprocessor 62 having a first data input port P1-0,3 and a second data input port P1-4,7. The first port P1-0,3 receives the four bits of the digital number on the second set of lines 46 and the second port P1-4,7 receives the four bits of the digital number on the fourth set of lines 54. Under software control described below, the microprocessor 62 then produces from a first output means 62A, in particular a first output port P2-0, the pulse trains on the first line 58 and from a second output means 62B, in particular a second output port P2-1, the pulse trains on the second line 60.

The data processor means 56 also includes third and fourth data input ports P3-0,P3-1, coupled by respective lines 71,73 and adapted to receive signals corresponding to the commanded direction of vehicle 18 travel in response to a direction control element, as discussed below.

In addition, the data processor means 56 includes third and fourth output ports P4-0,P4-1, coupled by respective lines 31a,31b to forward and reverse direction contactor coils 13,15 and associated coil drivers 17,19. Therefore, the data processor means 56 has input information relating to the commanded vehicle 18 direction and has control of the contactors responsible for controlling the vehicle 18 direction.

A first controllable means 64 responds to the pulse trains on the first line 58 by producing biasing signals on a third line 66 to turn "on" and "off" a first power switching means 68 for coupling power from a power source 69 to the first drive motor 12. The first controllable means 64 includes a first logic gate and amplifier circuit 70 to gate through and amplify the pulses of the pulse train onto the third line 66. The first power switching means 68 includes a first power transistor 72 in series with the first drive motor 12 and the power source 69, for example, a vehicle battery $\pm V_{BAT.}$, as shown. In response to the first power switching means 68 being turned "on", power is coupled from $+V_{BAT.}$ to energize the first drive motor 12.

A second controllable means 74 responds to the pulse trains on the second line 60 by producing biasing signals on a fourth line 76 to turn "on" and "off" a second power switching means 78 for coupling power from the source 69 to the second drive motor 14. The second controllable means 74 includes a second logic gate and amplifier circuit 80 to gate through and amplify the pulses of the pulse trains onto the fourth line 76. The second power switching means 78 includes a second power transistor 82 in series with the second drive motor 14 and the power source 69, as shown. In response to the second power switching means 78 being turned "on", power is coupled from $+V_{BAT.}$ to energize the second drive motor 14. The first drive motor 12 and associated power switching means 68 are in a parallel relationship with the second drive motor 14 and associated power switching means 78 with respect to the power source 69.

Additionally, the apparatus 10 includes a direction control means 37. The direction control means 37 includes normally open forward contacts 13a and 13b and normally closed reverse contacts 13c and 13d in series with the first drive motor 12. In response to the contacts 13a-d being in the state illustrated and the first transistor 72 being biased "on", current flows from the positive side of the power source 69 through the contact 13c, the first armature 23, the contact 13d, the first field 43 and the first transistor 72, to the negative side of the power source 69. In response to the contacts 13a-d each being in their respective alternate states and the first transistor 72 being biased "on", current flows from the positive side of the power source 69 through the contact 13a, the first armature 23, the contact 13b, the first field 43 and the first transistor 72, to the negative side of the power source 69.

The means 37 further includes normally open reverse contacts 15c and 15d and normally closed forward contacts 15a and 15b in series with the second drive motor 14. In response to the contacts 15a–d being in the state illustrated and the second transistor 82 being biased "on", current flows from the positive side of the power source 69 through the contact 15c, the second armature 25, the contact 15d, the second field 45 and the second transistor 82, to the negative side of the power source 69. In response to the contacts 15a–d each being in their respective alternate states and the second transistor 82 being biased "on", current flows from the positive side of the power source 69, through the contact 15a, the second armature 25, the contact 15b, the second field 45 and the second transistor 82, to the negative side of the power source 82.

The direction control means 37 also includes a first directional contactor coil 13 and a first switch 17, for example a transistor, which, in response to being closed or turned "on", energizes the coil 13 via the power source 69. The coil 13 controls the open-closed state of the contacts 13a, 13b, 13c, and 13d in a conventional manner. Another directional contactor coil 15 and switch 19 control the open-closed state of the contacts 15a, 15b, 15c, and 15d in a like manner. The switch 17 is closed in response to a directional control signal on a line 31b and the switch 19 is closed in response to a directional control signal on a line 31a. Note that the forward contacts 15a, 15b are normally closed and that the reverse contacts 15c, 15d are normally open, which is the opposite normal state of the contacts 13a, 13b, 13c, and 13d.

The direction control means 37 further includes a directional control switch 33 having a forward position F, neutral position N and reverse position R. With the switch 33 in the neutral position N, a first capacitor 51 is charged through a first resistor 55 from +V to a logic 1 and the output of a first inverter 59 on a line 71 is a logic 0, and a second capacitor 53 is charged through a second resistor 57 to a logic 1 from +V and the output of a second inverter 61 on a line 73 is a logic 0.

In response to the direction control switch 33 being moved to the forward position F, the first capacitor 51 is discharged through the first resistor 55 and the switch 33 to a logic 0 and the output on the line 71 is a logic 1 representing the forward direction. In response to the directional control switch 33 being moved to the reverse position R, the second capacitor 53 is discharged through the second resistor 57 and the switch 33 to logic 0 and the output on the line 73 from the second inverter 61 is a logic 1 representing the reverse direction.

Under software control, the microprocessor 62 responds to the logic 1 on the line 71 by delivering the directional control signal on the line 31b, to close or turn "on" the first switch 17, energize the first coil 13 and change the state of the contacts 13a, 13b, 13c, 13d. Therefore, the forward contacts 13a, 13b are closed, the reverse contacts 13c, 13d are opened and the forward contacts 15a, 15b remain closed. Consequently, the first motor 12 and the second motor 14 can be energized in the same, i.e., forward direction. Likewise, under software control, the microprocessor 62 responds to the logic 1 on the line 73 by delivering the output directional control signal on the line 31a, to close or turn "on" the second switch 19, energize the second coil 15 and change the state of the contacts 15a, 15b, 15c, 15d while the contacts 13a, 13b, 13c, 13d remain in their normal state. Therefore, the reverse contacts 15c, 15d are closed, the forward contacts 15a, 15b are opened and the reverse contacts 13c, 13d remain closed, so that the first motor 12 and the second motor 14 can be energized in the same, i.e., reverse direction.

Figure 3:
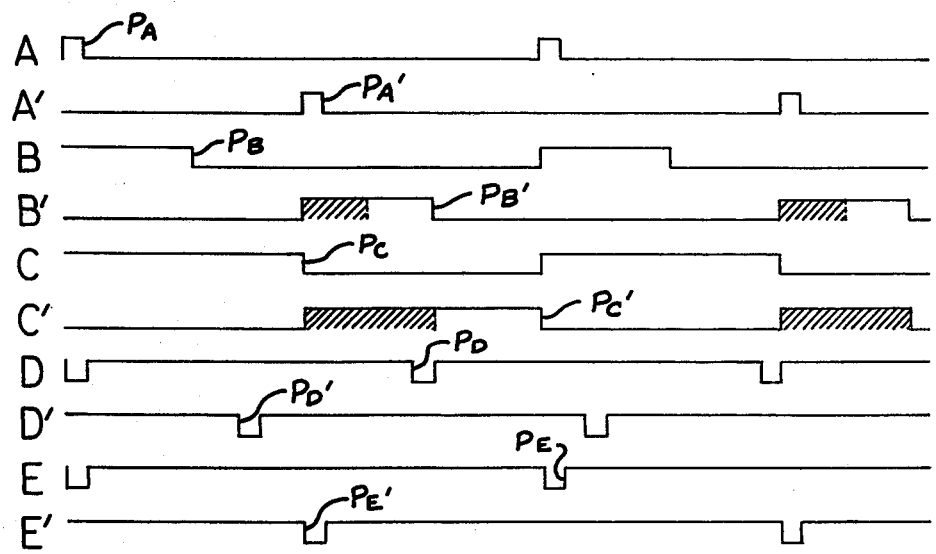
FIG. 3 illustrates pulse trains associated with certain operational modes of the apparatus diagrammed in FIG. 2.

FIG. 3 shows examples of pulse waveforms of the pulse trains produced by the microprocessor 62 at the first and second respective output ports P2-0, P2-1. Five pulse waveforms A–E are shown for the pulse trains on the first line 58 and five pulse waveforms A'–E' are shown for the pulse trains on the second line 60. FIGS. 3A–3C and FIGS. 3A'–3C' show the pulse trains corresponding to a motor speed range from the minimum speed greater than zero to half speed. FIGS. 3C–3E and FIGS. 3C'–3E' show the pulse trains corresponding to a motor speed range from half speed to the maximum controlled speed. The pulses shown in full lines correspond to the condition in which the vehicle 18 is driven along a straight path, whereas the shaded pulse portions correspond to a condition in which the vehicle 18 is driven along a curved path.

FIGS. 3A and 3A' illustrate the minimum speed pulse trains at respective ports P2-0 and P2-1. These pulse trains are of constant, minimum frequency in which the "on-time" of each pulse $P_A$ and $P_A'$ is constant. The pulses $P_A$ and $P_A'$ are out-of-phase for reasons described below.

FIGS. 3B and 3B' illustrate the pulse trains at respective ports P2-0 and P2-1 corresponding to a motor speed between minimum speed and half speed. These pulse trains are of constant, but increased pulse width relative to the pulse width shown in FIGS. 3A and 3A'. Since the pulse width is increased by increasing the "on-time" of the pulses while correspondingly decreasing the "off-time", the pulse train frequencies are unchanged. The pulses $P_B$ and $P_B'$ also are out-of-phase with one another.

FIGS. 3C and 3C' illustrate the pulse trains at respective ports P2-0 and P2-1 corresponding to the half speed condition. The frequency of these pulse trains remain unchanged from the frequencies shown in FIGS. 3B and 3B'; however, the pulse widths are increased to the 50% level. Again, the pulses $P_C$ and $P_C'$ are out of phase with one another.

FIGS. 3D and 3D' illustrate the pulse trains at respective ports P2-0 and P2-1 corresponding to a motor speed greater than half speed and less than full speed. In these pulse trains, the "on-time" of the pulses $P_D$ and $P_D'$ is increased over the "on-time" of the previously described pulses, while holding the "off-time" constant. This constitutes a decrease in frequency over the pulse trains of FIGS. 3C and 3C', but motor speed is increased owing to the longer "on-time" or higher duty cycle of these pulse trains. For these purposes, duty cycle is defined to be the ratio of pulse "on-time" to the period of one "on/off" cycle of a given pulse train. The pulses $P_D$ and $P_D'$ are also out-of-phase with one another, although they do overlap in time.

FIGS. 3E and 3E' illustrate the pulse trains at respective ports P2-0 and P2-1 corresponding to a maximum controlled speed condition. In these pulse trains, the "on-time" of the pulses $P_E$ and $P_E'$ is increased over the "on-time" of the pulses $P_D$ and $P_D'$, while holding the "off-time" constant and the same as shown for the pulse trains of FIGS. 3D and 3D'. This constitutes a decrease in frequency over the latter, but motor speed is increased due to the longer "on-time" or still higher duty cycle. The pulses $P_E$ and $P_{E'}$ are again out-of-phase with one another.

Each respective pair of pulse trains shown in FIGS. 3A, 3A', FIGS. 3B, 3B', FIGS. 3C, 3C', FIGS. 3D, 3D' and FIGS. 3E, 3E', while out-of-phase, are the same in that the pulse trains of a given pair ultimately cause the first drive motor 12 and the second drive motor 14 to be independently driven at the same speed. This sameness of the pulse trains occurs when the vehicle 18 is driven along a straight path, i.e., when the angle of the steerable wheel 35 is substantially 0°.

FIG. 3B' illustrates by the shaded area of the pulses a pulse train having a shorter "on-time" or lower duty cycle than that of the pulse train shown at FIG. 3B. With the pulse trains shown at FIGS. 3B and 3B' driving respective first and second drive motors 12,14, the motors 12,14 operate at different speeds with the magnitude of the difference being related to the duty cycle of the respective pulse trains. This difference in pulse trains is generated, for example, in response to the vehicle 18 negotiating a turn or curve, as indicated by the received steerable wheel 35 angle signal, with the pulse train of FIG. 3B' representing the inner wheel 20,22 command speed of the vehicle 18. Thus, a differential action is provided between the independently driven wheels 20,22.

The maximum pulsing of the vehicle control system 16 during the time that the steerable wheel 35 angle position is greater than 25° either side of the 0° position is limited to 50% of the maximum pulsing for substantially straight ahead operation, as shown by FIGS. 3C and 3C'. Therefore, the speed of the motors 12,14 is likewise limited to provide improved controllability of the vehicle 18 while negotiating a turn or curve.

Continuing the example, as the steerable wheel 35 angle increases in a turn, the "on-time" of pulse 3B' or 3C' continues to decrease relative to the "on-time" of pulse 3B or 3C, thereby increasing the speed differential of the wheels 12,14. Ultimately, at a preselected steerable wheel 35 angle, the "on-time" of pulse 3B' or 3C' is reduced to the minimum value shown in FIG. 3A'. Continued increase of the steerable wheel 35 angle beyond this preselected angle, i.e., in a sharp turn, causes the direction contacts 13a-d, 15a-d for the inner wheel 20,22 to reverse in response to an output on the line 31a, 31b, and the wheels 20,22 begin to counter rotate. The duty cycle of the pulse trains 3B', 3C' now increases with further increases in the steerable wheel 35 angle, causing an increasing differential in the speed of the counter-rotating wheels 20,22, until the maximum differential condition of FIG. 3C, 3C' is attained.

The pulse trains of the respective pairs shown in FIG. 3 are out-of-phase with one another to reduce or minimize battery ripple current by interlacing the pulsing of the first and second power transistors 72,74 which presents an effective higher system switching frequency to the power source 69.

Figure 4A:
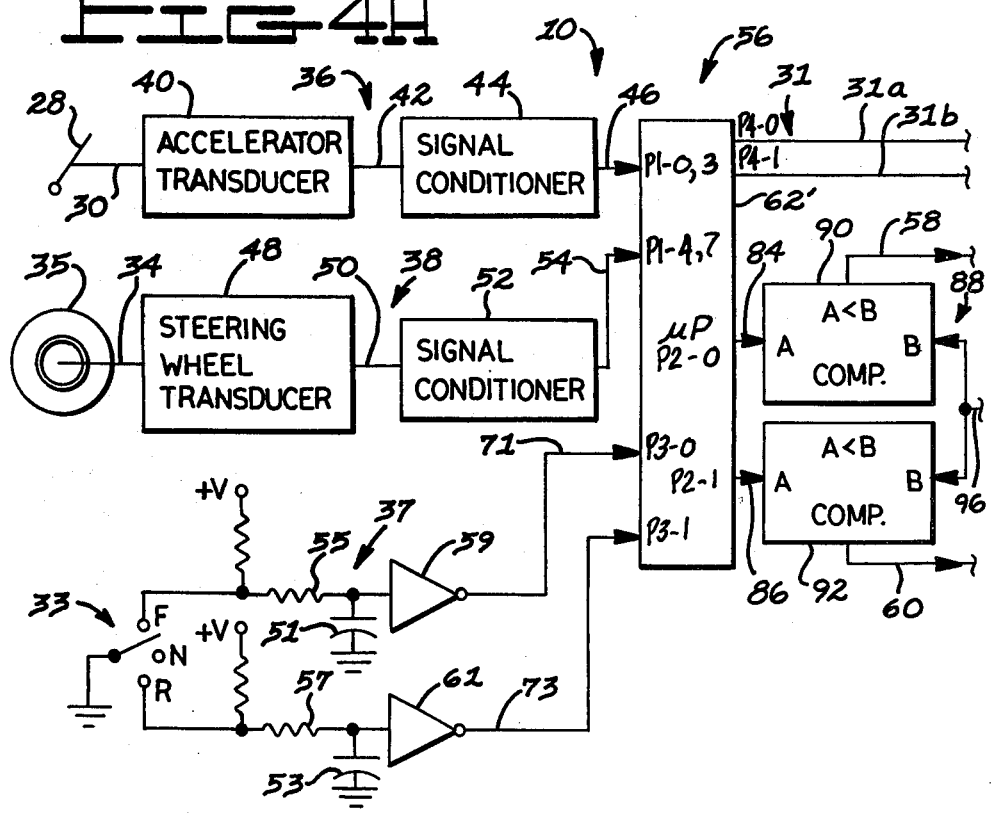
FIGS. 4A and 4B are block diagrams of an alternative embodiment of the present invention; and, FIG. 5 is a flowchart of the software for an embodiment of the present invention.
Figure 4B:
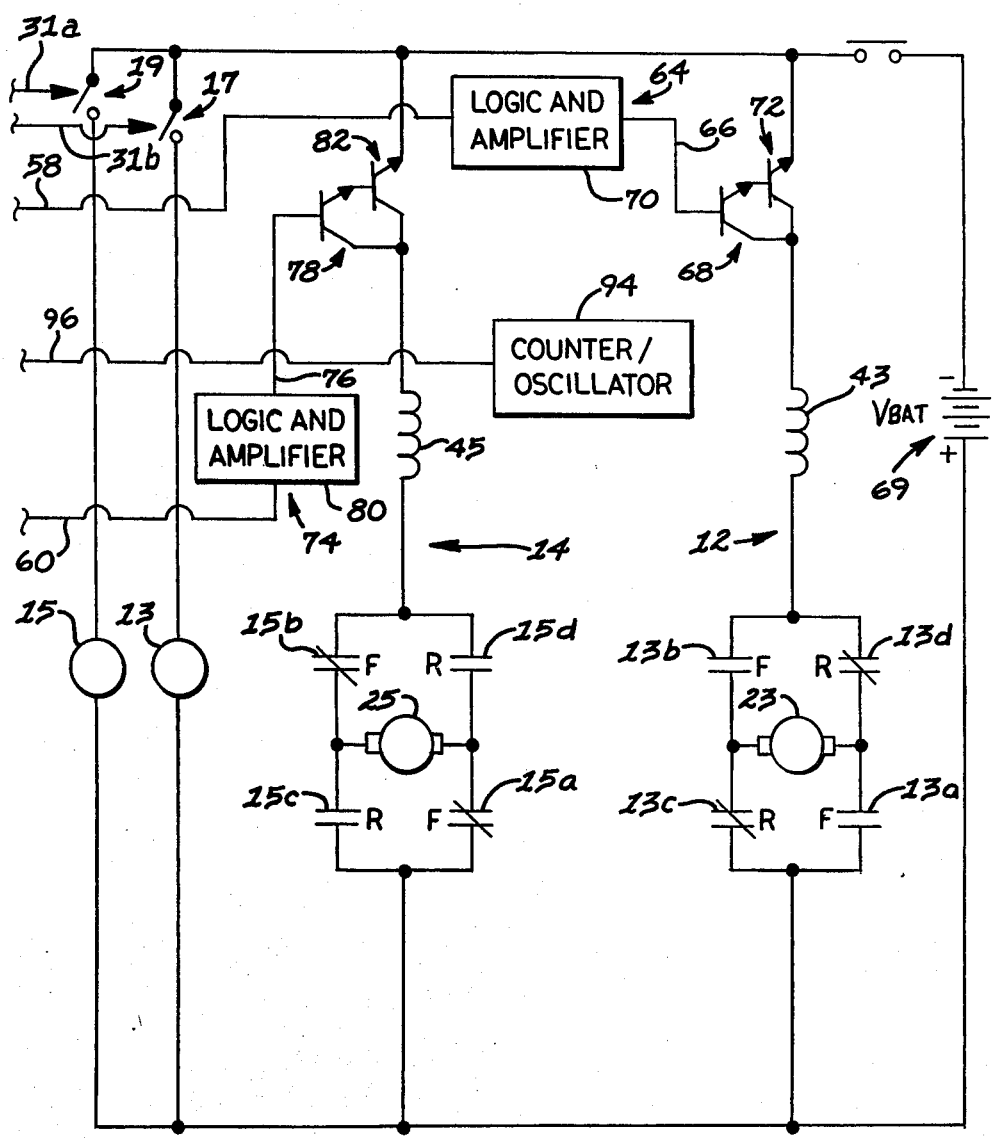

FIG. 4 illustrates another embodiment of the control circuit 10 having components similar to the embodiment shown in FIG. 2 as indicated by the like reference numerals. Thus, for example, the control circuit 10 of FIG. 4 has the first and second means 36,38 for generating respective digital numbers, the first and second controllable means 64,74, and the first and second power switching means 68,78.

The control circuit 10 of FIG. 4 also has the data processor means 56 for generating pulse trains on the first and second respective lines 58,60 in response to the digital numbers on the second set of lines 46 and the fourth set of lines 54. However, whereas the data processor means 56 of FIG. 2 has the microprocessor 62 which is software programmed to output the pulse trains of FIG. 3 at the first output port P2-0 and the second output P2-1 onto the first line 58 and the second line 60, respectively, the data processor means 56 of FIG. 4 has a microprocessor 62' which is software programmed to output 4-bit digital numbers at a third output port P2-0,3 onto a fifth set of lines 84 and 4-bit digital numbers at a fourth output port P2-4,7 onto a sixth set of lines 86. A digital number-to-pulse-train converter means 88 converts the digital numbers on the fifth set of lines 84 to pulse trains on the first line 58 and the digital numbers on the sixth set of lines 86 to pulse trains on the second line 60. These pulse trains from the converter means 88 are different from the pulse trains shown in FIG. 3.

The converter means 88 includes a first comparator 90, a second comparator 92 and a counter/oscillator 94. The first comparator 90 has an input A receiving the 4-bit numbers on the fifth set of lines 84, an input B receiving 4-bit numbers from the counter/oscillator 94 over a seventh set of lines 96 and an output A less than B coupled to the first line 58. The second comparator 92 has an input A receiving the 4-bit numbers on the sixth set of lines 86, an input B receiving the 4-bit numbers from the counter/oscillator 94 on the seventh set of lines 96 and an output A less than B coupled to the second line 60. The counter/oscillator 94 free runs at a fixed frequency to count from 0000 to 1111 which are the numbers produced on the seventh set of lines 96. After the counter/oscillator 94 reaches 1111, it restarts at 0000 and the counting cycle repeats.

As an example of the operation of the data processor means 56 of FIG. 4, assume that in response to a digital number on the second set of lines 46 and a digital number on the fourth set of lines 54, the microprocessor 62' outputs on the fifth set of lines 84 and on the sixth set of lines 86 the same number 1110. The first comparator 90 and the second comparator 92 thus have the same number 1110 at their respective pins A. As the counter/oscillator 94 counts through one cycle from 0000 to 1110, an output pulse of the first comparator 90 on the first line 58 and an output pulse of the second comparator 92 on the second line 60 is "low" since A is not less than B. Thus, during this time, the first controllable means 64 and the second controllable means 74 respond by turning "off" the first power switching means 68 and the second power switching means 78, respectively. Then, the condition A less than B will be true for only the one count of the counter/oscillator 94 1111, during which the output pulse on the first line 58 and the output pulse on the second line 60 is "high". The first controllable means 64 and the second controllable means 74 respond by turning "on" the first switching means 68 and the second switching means 78. When the counter/oscillator 94 restarts at 0000, the output pulses on the first line 58 and the second line 60 again go "low". Consequently, the drive motors 12,14 are powered for the same minimum speed corresponding to the minimum duty cycle of the pulses in the cycle on the first line 58 and the second line 60.

If greater motor speeds are required, the number on the fifth set of lines 84 and the number on the sixth set of lines 86 can be, for example, 1010. Then, for the counts in the cycle of the counter/oscillator 94 exceeding 1010, the pulse on the first line 58 and the pulse on the second line 60 will be "high" for a greater duration or "on-time." Therefore, the first controllable means 64 and the second controllable means 74 turn "on" the first switching means 68 and the second switching means 78 for a greater duration, resulting in more power being supplied to the drive motors 12,14 and, hence, higher motor speeds. It can be seen, therefore, that the pulses of the pulse trains on the first line 58 and the second line 60 are at a constant frequency, corresponding to the fixed frequency of the counter/oscillator 94, but of a varying duration or duty cycle depending on the condition A less than B. The pulse trains on the first line 58 and the second line 60 are the same, in the sense previously mentioned, when the drive motors 12,14 are to be driven at the same speed.

If, on the other hand, the first motor 12 and the second motor 14 are to be driven at differential speeds, as determined by the microprocessor 62', in response to the number on the fourth set of lines 54, then the numbers on the fifth and sixth sets of lines 84,86 are different from one another. For example, and with reference to the above examples, assume the number on the fifth set of lines 84 is 1110 and the number on the sixth set of lines 86 is 1010. The duty cycle of the pulses on the second line 60 is longer than the duty cycle of the pulses on the first line 58 for each cycle of the counter/oscillator 94. Therefore, the second drive motor 14 is controlled at a higher speed than the first drive motor 12.

FIG. 5 is a flowchart of a computer program suitable for controlling the vehicle control system 16. Only an exemplary software routine sufficient to implement one embodiment of the present invention is described herein. Sufficient detail is presented to allow one skilled in computer programming to write the required program to implement the flowchart for any common microprocessor. The program of FIG. 5 was designed to be run on a microprocessor produced by MOSTEK Corporation of Carrollton, Tex. and designated by the part number 3870.

Upon begining the program at the block 100 labeled START, control progresses through the following sequence:

In the block 102 information from the first transducer means 40 relating to the accelerator pedal 28 position, the second transducer means 48 relating to the steerable wheel 35 angle, and the direction switch 33 is received by the data processor means 56.

In the block 104 the steerable wheel 35 angle position is checked for a position greater than 25° from the center or 0° position, represented, for example, by a digital number less than 0111 or greater than 1000, coincident with an accelerator pedal 28 command speed greater than 50% of the maximum, represented, for example, by a digital number greater than 1000. If this combination of conditions is found to be present, program control is transferred to the block 150 labeled LIMIT, described below. If this condition is not present, control continues in the block 106 where the direction contactor coils 13,15 are energized according to the direction switch 33 command and the steerable wheel 35 angle position.

In the block 108 the motor 12,14 pulse requirements are selected from a look-up table stored in memory. Alternatively, the motor 12,14 pulses may be calculated directly by the microprocessor 62. The block 110 outputs the required pulses for the motors 12,14 on the lines 58,60 in the embodiment of FIG. 2 or the required digital words on the lines 84,86 in the embodiment of FIG. 4.

Following the pulsing of the motors 12,14, control is transferred back to the START block 100 and the program routine begins anew.

Adverting to the above description of the block 104, if program control was transferred to the LIMIT block 150, the vehicle 18 is negotiating a turn in response to a steerable wheel 35 angle position greater than 25° from the 0° or straight ahead position coincident with a command motor speed in excess of 50% of the maximum command speed. Under these conditions it is desirable to limit the vehicle 18 speed to less than maximum in order to provide improved controllability of the vehicle 18. Therefore, the steps performed in the blocks 156,158 are identical to those described above for the respective blocks 106,108, but in the block 160 and under software control the pulse requirements from the block 158 are limited to 50% of maximum. Control then returns to the main program at the block 110 where the motors are pulsed, and the sequence proceeds as described above.

INDUSTRIAL APPLICABILITY

As previously indicated, the vehicle 18 can be, for example, an electric fork lift truck which is used for handling various materials.

In operation, assume that the vehicle 18 is to be driven in a straight path. The vehicle operator maintains the steerable wheel 35 at an angle of substantially 0° and depresses the accelerator pedal 28 to a position corresponding to a desired speed. Consequently, the first means 36 produces a digital number on the second set of lines 46 in response to the position of the accelerator pedal 28 and the second means 38 produces a digital number on the fourth set of lines 54 representing an angular position of 0° in response to the position of the steerable wheel 35.

The data processor means 56, being responsive to the digital numbers on the second set of lines 46 and the fourth set of lines 54, and being under software control, outputs substantially identical pulse trains on the first line 58 and the second line 60 to turn "on" and "off" the first power switching means 68 and the second power switching means 78, respectively, via the first controllable means 64 and the second controllable means 74. Consequently, the same power is delivered to the drive motors 12,14, resulting in these motors 12,14 and the associated first and second wheels 20,22 rotating at the same desired speed.

The operator can increase or decrease the speed of the vehicle 18 as it is driven along the straight path by further depressing or releasing the accelerator pedal 28. This results in different command speed digital numbers being generated on the second set of lines 46. In response, the data processor means 56 outputs the appropriate pulse trains on the first line 58 and the second line 60, as discussed in connection with the embodiments of FIGS. 2 and 4, to supply substantially identical increased or decreased power to the first drive motor 12 and the second drive motor 14, causing the vehicle 18 to increase or decrease in speed.

Assume now that the vehicle 18 is to be driven in a curved path. The vehicle operator rotates the steerable wheel 35, in response to moving the steering wheel 32, to an angular position other than 0° and depresses the accelerator pedal 28 to a preselected position. In response, the first means 36 produces a digital number on the second set of lines 46 representing the same command speed for the first motor 12 and the second motor 14. The second means 38 generates a digital number on the fourth set of lines 54 representing a differential speed corresponding to the angular position of the steerable wheel 35. The data processor means 56 responds to these numbers by generating the different pulse trains on the first line 58 and the second line 60, as described in connection with FIGS. 2 and 4, to differentially drive the first and second motors 12,14. With the steerable wheel 35 at this angular position other than 0°, the accelerator pedal 28 can be further depressed or released to increase or decrease the speed of the vehicle 18 traversing the curved path. While the speed of the first and second motors 12,14 increases or decreases, the differential speed remains proportional in accordance with the position of the steerable wheel 35. However, in response to a steerable wheel 35 angle position greater than a preselected magnitude from 0°, the pulse trains generated on the lines 58,60 are limited in duty cycle to a preselected percentage of the maximum pulse train duty cycles, i.e., 50% of a 100% or full-on duty cycle.

Additionally, in response to a steerable wheel 35 angle position greater than a second preselected magnitude from 0°, the microprocessor 62 switches a preselected one of the direction contact coils 13,15 to reverse the direction of rotation of the respective one of the motors 12,14 and associated wheels 20,22.

In summary, the various components shown in FIGS. 2 and 4 function in the digital domain and are implemented as integrated circuits. These components include the signal conditioning circuits 44,52, the microprocessor 62,62', the logic and amplifier circuits 70,80 and the digital number-to-pulse-train converter 88. Furthermore, the microprocessor 62,62' can be easily software programmed with different software to produce other pulse trains to adequately drive various sized or rated motors 12,14 for different vehicles 18.

Moreover, the present invention, embodying digital and software programmable circuitry, is reliable and cost-effective. The circuitry responds quickly to command information and can be manufactured using integrated circuit technology to reduce space requirements.

Other aspects, objects and advantages of this invention can be obtained from a study of the drawings, the disclosure and the appended claims.

We claim:

1. A vehicle control system (16), comprising:
   first and second drive motors (12,14);
   an accelerator (28) adapted to produce first command motor speed signals;
   an accelerator transducer means (40) for receiving said first command motor speed signals and generating first digital numbers in response to said received signals;
   a steerable wheel (35) adapted to produce second command motor speed signals;
   a steerable wheel tranducer means (48) for receiving said second command motor speed signals and generating second digital numbers in response to said received signals;
   programmable data processor means (56) for generating first and second pulse trains in response to receiving said first and second digital numbers;
   first and second power switching means (68,78) for coupling power to respective first and second drive motors (12,14); and first and second controllable means (64,74) for controllably operating said first and second power switching means (68,78) in response to receiving respective first and second pulse trains.

2. A vehicle control system (16), as set forth in claim 1, wherein said first and second pulse trains have substantially identical waveforms in response to said second digital numbers having magitudes in a first preselected range.

3. A vehicle control system (16), as set forth in claim 2, wherein said first and second pulse trains have different waveforms in response to said second digital numbers having magnitudes in a second preselected range.

4. A vehicle control system, as set forth in claim 3, wherein said first and second preselected ranges are mutually exclusive.

5. A vehicle control system (16), as set forth in claim 2, wherein said first and second pulse trains have substantially the same constant pulse frequency and increasing pulse duty cycles in response to a first preselected range of increasing command motor speed signals and have substantially the same decreasing pulse frequency and increasing pulse duty cycles in response to a second preselected range of increasing command motor speed signals.

6. A vehicle control system (16), as set forth in claim 5, wherein said first and second pulse trains have substantially the same constant pulse frequency and different pulse duty cycles in response to said first preselected range of increasing command motor speed signals.

7. A vehicle control system (16), as set forth in claim 6, wherein said pulse duty cycle of said second pulse train decreases and said pulse duty cycle to said first pulse train remains constant in response to said second preselected range of increasing command motor speed signals.

8. A vehicle control system (16), as set forth in claim 1, wherein said first pulse train is generated in response to said means (56) receiving said first digital number and said second pulse train is generated in response to said means (56) receiving said first digital number and said second digital number.

9. A vehicle control system (16), as set forth in claim 1, wherein said first and second drive motors (12,14) are controllably operated in the same direction in response to said second digital numbers having magnitudes in a third preselected range and in opposite directions in response to said second digital numbers having magnitudes in a fourth preselected range.

10. A vehicle control system (16), comprising:
   (a) first and second drive wheels (20,22);
   (b) first and second electrical drive motors (12,14) being connected to respective first and second drive wheels (20,22);
   (c) an accelerator pedal (28) being movable to any one of a plurality of positions and adapted to produce a first command speed signal;
   (d) a steerable wheel (35) being movable to any one of a plurality of positions and adapted to produce a second command speed signal;
   (e) first means (36) for generating first digital numbers in response to receiving said first command speed signal;
   (f) second means (38) for generating second digital numbers in response to receiving said second command speed signal;
   (g) programmed data processor means (56) for generating first and second pulse trains in response to receiving said first and second digital numbers, said first and second pulse trains having substantially the same waveforms in response to said received second digital numbers having magnitudes in a first predetermined range and having different waveforms in response to said received second digital numbers having magnitudes in a second predetermined range exclusive of said first range;

(h) a vehicle power source (69);

(i) first power switching means (68) for coupling power from said vehicle power source (69) to said first drive motor (12);

(j) second power switching means (78) for coupling power from said vehicle power source (69) to said second drive motor (14);

(k) first controllable means (64) for controllably operating said first power switching means (68) in response to receiving said first pulse train; and, (l) second controllable means (74) for controllably operating said second power switching means (78) in response to receiving said second pulse train.

11. A vehicle control system (16), comprising:

first and second drive motors (12,14);

a accelerator (28) adapted to produce first command motor speed signals;

an accelerator tranducer meaas (40) for receiving said first command motor speed signals and generating first digital numbers in response to said received signals;

a steerable wheel (35) adapted to produce second command motor speed signals;

a steerable wheel transducer means (48) for receiving said second command motor speed signals and generating second digital numbers in response to said received signals;

programmable data processor means (56) for producing respective third and fourth digital numbers in response to receiving said first and second digital numbers;

converter means (88) for generating first and second pulse trains in response to receiving said third and fourth digital numbers;

first and second power switching means (68,78) for coupling power to respective first and second drive motors (12,14); and, first and second controllable means (64,74) for controllably operating said first and second power switching means (68,78) in response to receiving respective first and second pulse trains.

12. A vehicle control system (16), as set forth in claim 11, wherein said converter means (88) includes an oscillator (94) and first and second digital comparators (90,92), each of said comparators (90,92) having a first input connected in common to said oscillator (94) and a second input connected to receive a respective one of said third and fourth digital numbers.

* * * * *